United States Patent

Deguchi et al.

[15] 3,686,432

[45] Aug. 22, 1972

[54] RUNNING-SPEED CONTROL SYSTEM FOR MAGNETIC RECORDING MEDIUM

[72] Inventors: Masahiro Deguchi, Higashi-Osaka; Osahiko Yano, Kadoma, both of Japan

[73] Assignee: Matsushita Electric Industrial Co., Ltd., Oara Kodoma, Kadoma-shi, Osaka, Japan

[22] Filed: Sept. 29, 1970

[21] Appl. No.: 76,498

[30] Foreign Application Priority Data

Oct. 7, 1969 Japan ......................44/80642
Nov. 14, 1969 Japan ......................44/91636

[52] U.S. Cl. ...178/6.6 P, 179/100.2 S, 340/174.1 A, 340/174.1 B, 340/174.1 P

[51] Int. Cl. ..........................G11b 15/52, H04n 5/78

[58] Field of Search...178/6.6 A, 6.6 P; 179/100.2 T, 179/100.2 S; 340/174.1 A, 174.1 B, 174.1 P

[56] References Cited

UNITED STATES PATENTS 3,402,350 9/1968 Schellabarger......179/100.2 S
3,549,797 12/1970 Dann......................178/6.6 P
3,361,949 1/1968 Brown....................178/6.6 P

*Primary Examiner*—Howard W. Britton
*Attorney*—Stevens, Davis, Miller & Mosher

[57] ABSTRACT

A running speed control system for a magnetic recording medium, in which reference signals of a specified frequency are recorded on a running magnetic recording medium and successively regenerated, and then the phase of the regenerated signals is compared with that of the reference signals, a driving mechanism for driving said magnetic recording medium being controlled in accordance with the phase difference thus developed, thereby to feed said magnetic recording medium at a speed relative to said reference signals.

5 Claims, 6 Drawing Figures

M. DEGUCHI, &
O. YANO
INVENTORS

BY Stevens, Davis, Miller & Mosher
ATTORNEYS

RUNNING-SPEED CONTROL SYSTEM FOR MAGNETIC RECORDING MEDIUM

The present invention relates to a system for controlling the running speed of a magnetic recording medium including a magnetic tape, magnetic disc or magnetic cylinder used in a magnetic recording and reproducing device.

In the conventional servo system for a capstan of a magnetic tape recorder, a reference frequency signal, which is additionally recorded at the edge of a magnetic tape simultaneously with the recording of information, is regenerated at the time of playback and phase-compared with a reference signal, thereby to control the capstan driving system. This method is aimed at bringing the playback tape speed into agreement with the recording tape speed and therefore the wow, if any, developed during a recording operation reappears in the playback of the tape. In the case of a two rotary head type helical scanning video tape recorder, however, a video signal corresponding to one field of video signal in an oblique track by a rotary head to the running tape whose speed has generally some irregularity (tape speed wow) and therefore any wow at the time of recording causes a difference in location of recorded video signals.

In the case of a capstan-servo-type tracking control system in which a rotational position signal detected from the shaft of a rotary head is phase-compared with a control signal picked up from the tape edge and the tape feed is controlled in such a manner that the reproducing head traces a recording locus the control signal is displaced because of the wow caused at the time of recording. The playback is controlled, however, in such a manner that it is made in the same conditions as in the recording. There is no problem if the conditions are completely the same, but the trouble is that the speed control of a rotary body such as a capstan shaft which has an inertia force generally develops a time lag in a servo system. In other words, there is a frequency response characteristic whereby the servo system is less responsive to a frequency variation above a certain level, usually several c/s, being 100 percent responsive only to the frequency variation below that level. In addition, even if the 100 percent responsiveness is achieved, there may be a phase lag, making it impossible to completely compensate for the wow caused at the time of recording. In such a case, a playback signal picked up by the rotary head develops time jitters corresponding to a lag in response by the capstan servo system. To overcome this difficulty, a precision-type video tape recorder is equipped with a tape feed mechanism with a higher precision to minimize the tape wow, and the remaining jitters which the servo system failed to eliminate are corrected by the use of a highly complicated, expensive electric circuit. Also, in the conventional tape recorder, it is usually be improving the precision of the tape feed mechanism that a reduction in wow is made.

In view of these problems, it is the primary object of the present invention to feed a recording medium at a speed in a specified relationship with the frequency of a reference signal.

Another object of the present invention is to provide a method by which a capstan servo system is applied also to a recording operation in order to minimize the tape wow at the time of recording, thereby to eliminate the drift without improving the precision of the tape feed mechanism; that is to say, a reference signal which is recorded on the tape is regenerated, and the tape speed is controlled by an error signal which is the result of a comparison made between the recorded reference signal and the regenerated reference signal.

Still another object of the present invention is to provide a magnetic video recording and reproducing device incorporating the above-mentioned features.

The above and other objects, features and advantages will be made apparent by the detailed description taken in conjunction with the accompanying drawings, in which.

Figure 1:
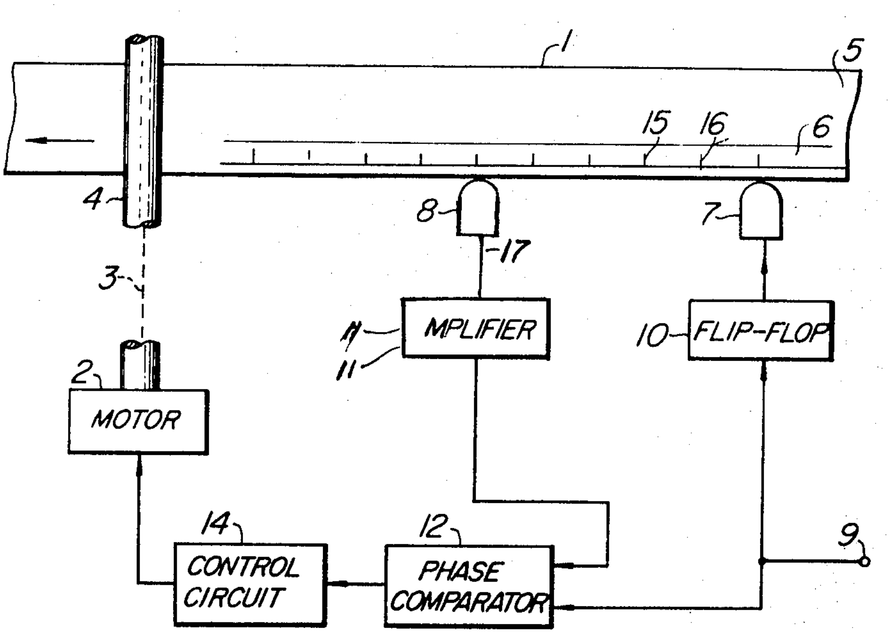
FIG. 1 is a block diagram showing an electric circuit of an embodiment of the present invention.
Figure 3:
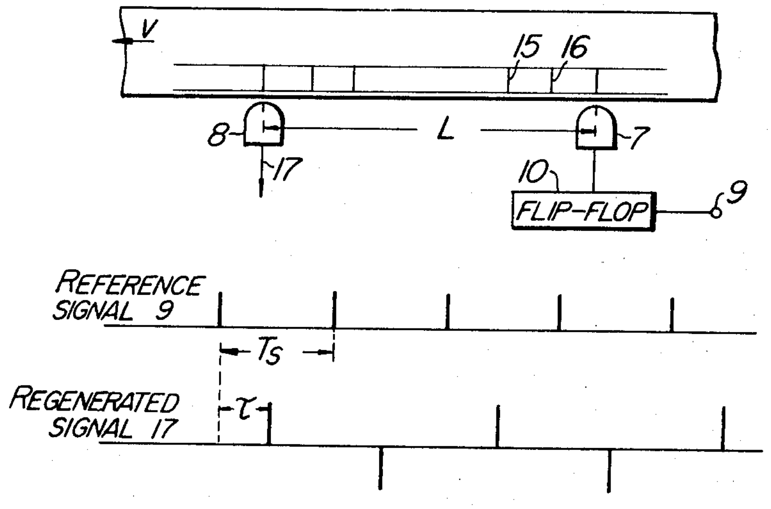
FIG. 3 is a diagram illustrating the operation of the embodiments of FIGS. 1 and 2.

Referring now to FIG. 1, the magnetic tape 1 is pressure-driven between pinch rollers (not shown in the drawing) by the capstan shaft 4 coupled directly or indirectly through an appropriate coupling means 3 to the capstan-driving motor 2. The surface of the tape 1 is divided into the region 5 where information is recorded and the control track 6 where control signals are recorded. The two heads 7 and 8 facing the control track 6 are placed at an appropriate distance from each other. The head 7 is for recording the signal for detecting a tape speed, and the head 8 for reproducing it. Reference signals at regular intervals to each other applied to the terminal 9 are supplied through the flip-flop or monostable multivibrator 10 to the head 7, whereby said reference signals are recorded on the track 6 in the form of, for example, traces 15 and 16 as tape speed detecting signals. The tape speed detecting signals thus recorded are picked up successively by the head 8. Here, the relationship between the reference signal 9 and the regenerated signal 17 or the phase difference therebetween, as shown in FIG. 3, is expressed as:

$$L/V = nT_s + \tau$$

where $V$ is the running speed of tape 1, $L$ is the distance between the recording head 7 and the regenerating head 8, $T_s$ is the interval between the reference frequency signals 9 and $n$ is O or a positive integer. Any wow in tape feed causes a variation in phase difference $\tau$. Expressing the above equation another way.

$$V = L/nT_s + \tau$$

which shows that, if the values $L$, $n$ and $T_s$ are fixed, the tape speed $V$ is determined by the phase difference $\tau$. The tape speed, therefore, can be maintained in a specified relationship with the reference signal 9 by controlling the capstan servo system in such a manner as to fix the phase difference at a certain value.

As a capstan motor 2 shown in FIG. 1, a brushless d-c motor is used. The phase comparator 12 compares the phase of the reference signal 9 with that of the regenerated signal 17 which is amplified by the amplifier 11. A device with a high sensitivity has to be used as the phase comparator 12. The output of the phase comparator 12 is applied to the speed control circuit 14 for the brushless motor 2. The speed control circuit 14 is so constructed that, when the output of the phase comparator 12 is not applied to it, the brushless motor 2 is driven at almost a predetermined speed required to feed the tape. By superposing the output of the speed control circuit 14 on that of the phase comparator 12 in such a manner as to maintain the phase difference $\tau$ at a certain value, the required value of tape speed can be obtained. The wow and flutter attributable to the tape running mechanism can thus be eliminated by controlling the tape feed in such a manner as to maintain the phase difference at a certain value.

Figure 2:
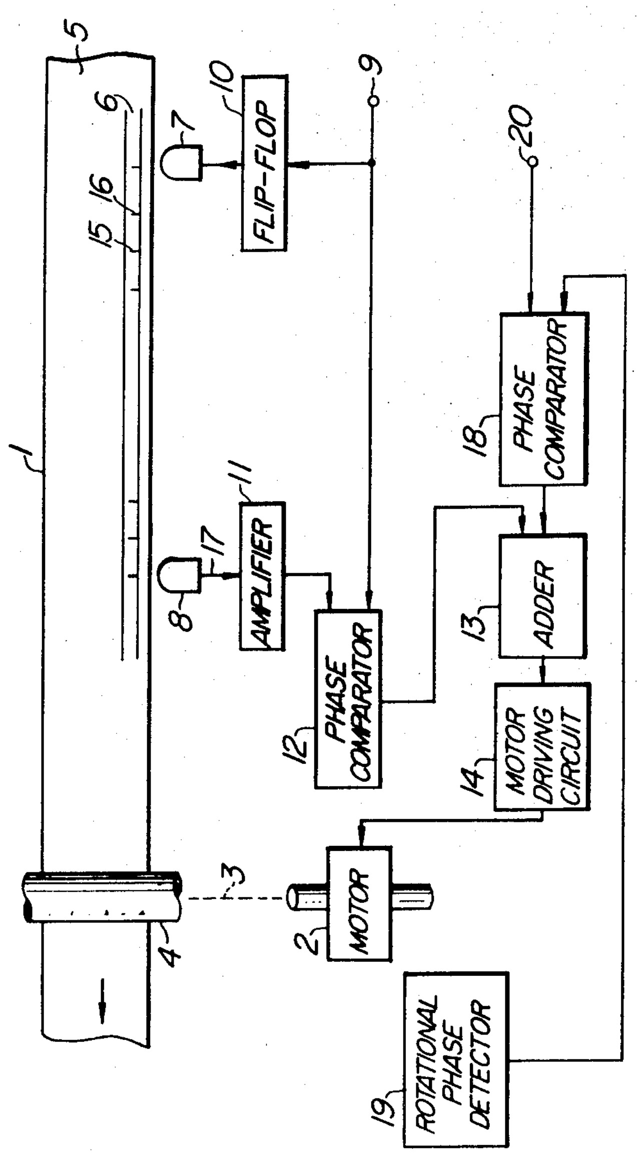
FIG. 2 is a circuit block diagram showing the essential components of a second embodiment.

In another embodiment of the invention as shown in FIG. 2, the phase comparator 18 compares the phase of another reference signal 20, which may be the same as the reference signal 9, with that of a signal in connection with the rotational phase of the capstan motor 2 supplied from the rotational phase detector 19. The resulting signal is applied through the adder circuit 13 to the motor driving circuit 14. The output of the motor driving circuit 14 controls and drives the capstan motor 2 according to the frequency of the reference signal 20. The regenerated signal 17 from the regenerating head 8 is amplified by the pulse amplifier 11 and compared with the reference signal 9 by the phase comparator 12, which produces an output signal proportional to the phase difference $\tau$ between the reference signal 9 and the regenerated signal 17. The capstan motor 2, whose control system receives from the adder circuit 13 the output of the phase comparator 12, is not only synchronously driven, but also its momentary speed is controlled in accordance with the signals connected with the wow, thereby to maintain the phase difference $\tau$ at a fixed level, namely, to absorb the wow. Instead of the entire output of the phase comparator 12, only the variation in output corresponding to the wow may be applied to the adder circuit 13.

Figure 4:
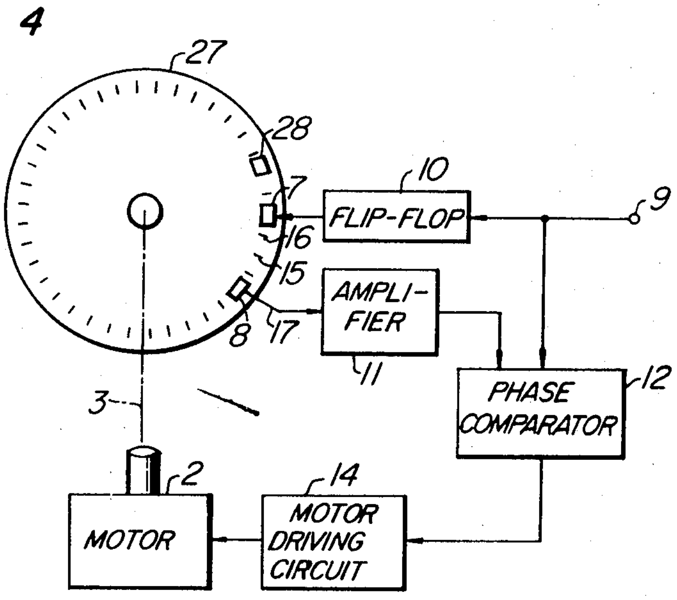
FIG. 4 is a block diagram showing the essential components of another embodiment.

In place of a magnetic tape used in the above-described embodiment, a rotary magnetic disc 27 as shown in FIG. 4 which is driven by the driving motor 2 and with two magnetic heads 7 and 8 disposed on its periphery may be employed so as to rotate the disc in accordance with a reference signal, while the other components are arranged in the same manner as in FIGS. 1 and 2. The rotary magnetic disc may be replaced by a magnetic cylinder. The numeral 28, incidentally, shows an erasing head.

Figure 5:
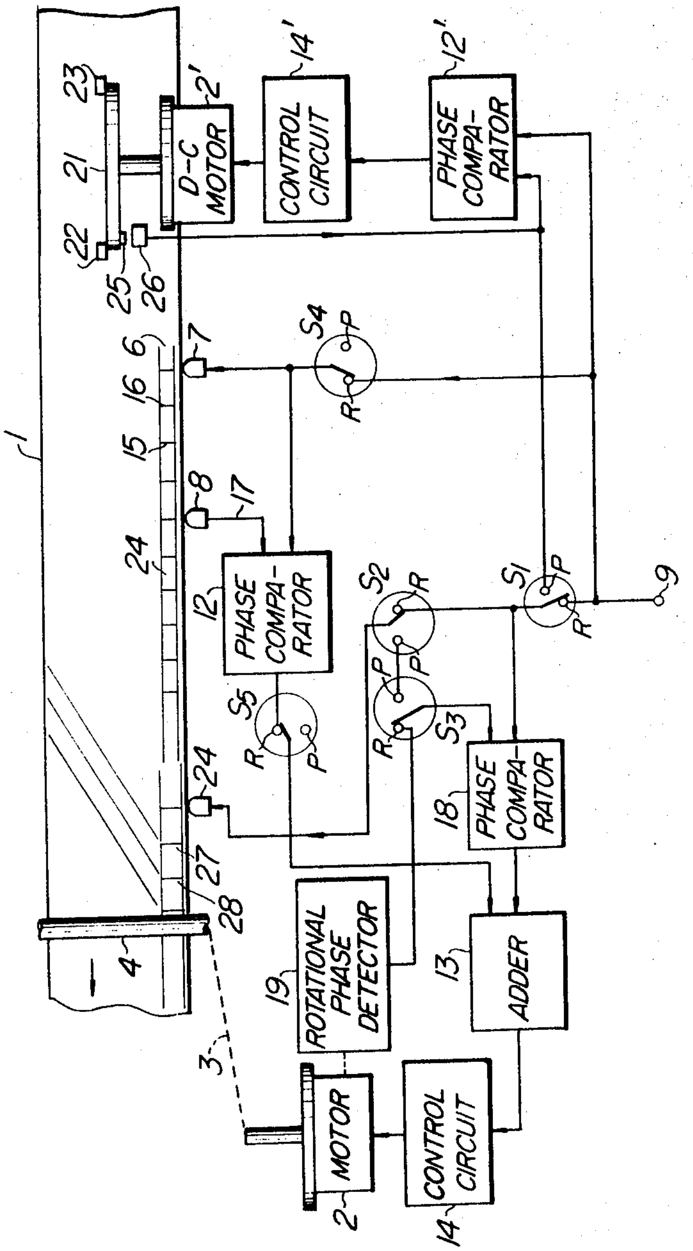
FIGS. 5 and 6 are block diagrams of an electric circuit embodying the present invention in a rotary-head-type magnetic video recording and reproducing device.

Explanation will be made below of an embodiment in which the control system according to the present invention is applied to a rotary-head-type magnetic recording and reproducing device. Referring to FIG. 5, the rotary disc 21 is provided with two magnetic heads 22 and 23 arranged at 180° to each other, and image signals representing almost a field are recorded in and reproduced from one continuous oblique track for every half rotation of the disc 21. The immovable detecting head 26 produces a rotational signal at each rotation of the disc 21, which is synchronizingly rotated with the 30Hz signal 9 or a half cycle of a vertical synchronizing signal in video signals by means of the permanent magnet 25 placed on the rotary disc 21. If the d-c motor 2' for driving the rotary disc is controlled by the control circuit 14' in such a manner as to run at about 1800 rpm, the frequency of said rotational signal will be about 30Hz. The phase comparator 12' compares the 30Hz signal from the terminal 9 with the rotational signal, and the resulting error signal is superposed on the output of the speed control circuit 14'. Thus the d-c motor 2' is driven in synchronism with the signal from the terminal 9.

At the time of recording, the 30 Hz signal from the terminal 9 is recorded by the control head 24 as a control signal 28 through the switches $S_1$ and $S_2$ to prepare for the tracking control at the time of reproducing. Also, the capstan system is driven with high precision, absorbing the tape wow by the same method as in the above-mentioned embodiment.

Since the control head 24 is located behind the heads 7 and 8 in the direction of tape feed as shown in FIG. 5, the tape speed detection traces 6 are erased as the result of saturable recording by the control head 24, thereby eliminating the need for a new recording area. If the width of the track for the control head 24 is made larger than that for the head 7, no traces are left unerased and therefore the control signal 28 is not disturbed.

At the time of reproduction, the switches $S_1$ to $S_5$ are connected with the terminal P and a tracking servo system can be obtained by using the control signal recorded and the rotational signal of the rotary head as the input signals to be compared in the phase comparator 18 for the capstan servo system. The motor 2' may well be driven at a speed of almost 1800 rpm as determined by the speed control circuit 14', but it had best be so constructed that an oscillator which can generate a 30 Hz signal is included and the output of the oscillator plus the rotational signal of the rotary head are applied to the phase comparator 12', thereby to enable the motor 2' to rotate in synchronism with the oscillating phase of the oscillator.

It is obvious that any of the tracks may be used if an erasing head (not shown in the drawing) is disposed ahead of the heads 7 and 8. In the arrangement described above with reference to FIG. 5, the control head 24 is provided separately from the tape feed detecting heads 7 and 8. This arrangement may be replaced by the one in which the tape speed detecting heads 7 and 8 double as a control head, as illustrated in the embodiment of FIG. 6.

Figure 6:
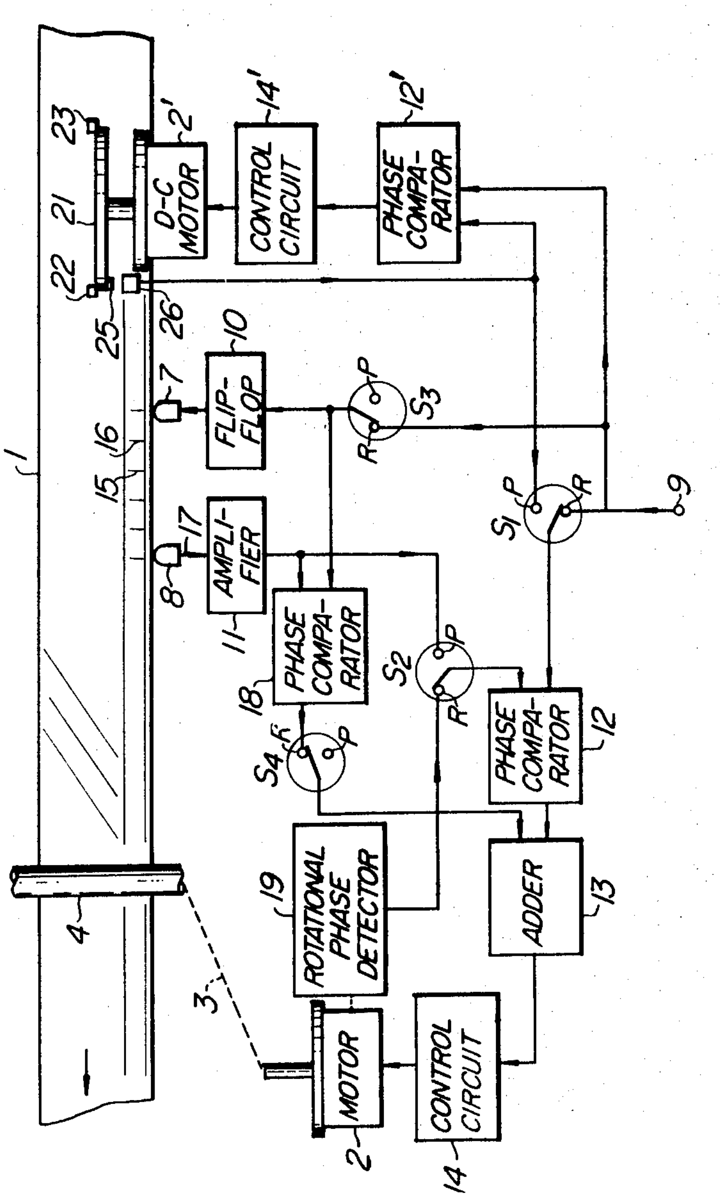

In FIG. 6, the motor 2' is driven synchronously by the phase comparator 12' and the speed control circuit 14' in such a manner that a signal of the detecting head 26 for detecting the rotational phase of the head disc 21 is synchronized with the signal of the terminal 9 which is equivalent to a half cycle of the vertical synchronizing signal in the video signals to be recorded. On the other hand, the capstan motor 2 is controlled by the combination of phase comparator 12, adder circuit 13 and motor driving circuit 14 in such a manner that a signal from the rotational position detector 19 and the signal of the terminal 9 are synchronized with each other. At the same time, the output 17 of the reproducing head 8, after being amplified by the pulse amplifier 11, is phase-compared with the signal from the terminal 9 by the phase comparator 18 and the resulting signal is applied through the switch $S_4$ to the adder circuit 13, thereby to compensate for the wow. The signal supplied from the terminal 9 is applied through the switch $S_3$ and the amplifier 10 to the recording head 7, whereby said signal is recorded, for example, as the traces 15 and 16 on the tape. These recorded signals are also utilized as a control signal at the time of reproduction. In other words, the head 7 for recording tape speed detection signal functions not only as a recording head for wow compensation, but also as a head for recording a control signal at the same time. At the time of reproduction, the terminal 9 is impressed with the output of an oscillator — preferably to be built in the video tape recorder — which generates a reference signal of 30 Hz, and the motor 2' is driven by the same control method simultaneously with recording. At the time of playback, no signal is applied through the switch $S_3$ to the amplifier 10 for the recording head 7 and therefore no current flows in the head 7. As a result, only the recorded signals 15 and 16 remain without any new signal being recorded. The capstan motor 2 is driven by the combination of the phase comparator 12, adder circuit 13 and the motor driving circuit 14, the phase comparator 12 comparing the output 17 of the tape-speed-detecting-signal-regenerating head 8 which is amplified by the pulse amplifier 11 with a signal of the detecting head 26 for detecting the rotational phase of the disc 21, thereby tracking the capstan servo system. In this case, the switch $S_4$ is operated in such a manner as to prevent the signal of the phase comparator 18 from being applied to the adder circuit 13. As will be seen from the above description, the head 8 regenerates a control signal at the time of reproduction and no independent control head is required.

It is also evident that, instead of a d-c motor, a different kind of motor may be used. For example, an a-c synchronous motor may be driven by the power-amplified output of a variable frequency oscillator. Another alternative is to drive an a-c induction motor in the same way as that mentioned above or to apply a brake to the capstan in accordance with the output of the phase comparator.

It will be understood from the above description that this invention provides a system for eliminating wow and flutter while driving a recording medium at a speed in a specified relationship with a reference signal frequency without improving the precisions of a recording medium driving mechanism and irrespective of the wear of the driving mechanism, changes in atmospheric conditions or prolonged use.

What is claimed is:

1. A running-speed control system for a magnetic recording medium in which two magnetic heads are disposed at a certain distance from each other, each facing a magnetic recording medium in such a manner as to leave the same traces on said magnetic recording medium, one of said magnetic heads recording a reference signal of a certain frequency on said magnetic recording medium, the other of said magnetic heads successively regenerating said recorded signals, said regenerated signal and said reference signal being phase-compared with each other, a driving mechanism being controlled in accordance with the resulting phase difference, a certain relationship being thereby maintained between the running speed of said magnetic recording medium and the frequency of said reference signal.

2. A running-speed control system for a magnetic recording medium according to claim 1, in which said reference signal of a certain frequency is a vertical synchronizing signal among video signals to be recorded.

3. A running-speed control system for a magnetic recording medium comprising a driving mechanism for driving a magnetic recording medium; a rotational phase detector means for producing a signal in accordance with the rotational phase of said driving mechanism; a first phase comparator circuit for detecting a phase difference between a signal from said rotational phase detector means and a first reference signal of a certain frequency; a recording means maintained in contact with said magnetic recording medium for recording a second reference signal of a certain frequency on said magnetic recording medium; a regenerating means for successively regenerating signals recorded by said recording means; a phase comparator circuit for detecting a phase difference between a regenerated signal from said regenerating means and said second reference signal; and a control means for controlling said driving mechanism in accordance with the output of said first and second phase comparator circuits.

4. A running-speed control system for a magnetic recording medium comprising a capstan shaft mechanism for driving a magnetic tape; rotary head means adjacent to said magnetic tape and rotated in synchronism with a standard signal, said rotary head means recording and regenerating a video signal on said recording medium; a first magnetic head for recording a standard signal corresponding to a vertical synchronizing signal in said video signal to be recorded in said magnetic tape in recording said video signal; a second magnetic head for regenerating the recording track of said first magnetic head successively; a first phase comparator circuit for detecting a phase difference between the output of said second magnetic head and said standard signal; a control means for controlling said capstan mechanism by means of the output of said second magnetic head; a third magnetic head for recording said standard signal as a control signal on the recording track of said first magnetic head; a second phase comparator circuit for detecting a phase difference between a regenerated control signal from said third magnetic head and a signal corresponding to the rotational phase of said rotary head means, a first supply means for supplying the output of said second phase comparator circuit to said control means as a control signal; and a second supply means for supplying said regenerated control signal to said rotary head means as a standard signal.

5. A running-speed control system for a magnetic recording medium comprising a capstan shaft mechanism for driving a magnetic tape; rotary head means adjacent to said magnetic tape and rotated in synchronism with a standard signal, said rotary head means recording and regenerating a video signal on said recording medium; a first magnetic head for recording a standard signal corresponding to a vertical synchronizing signal in said video signal to be recorded in said magnetic tape in recording said video signal; a second magnetic head for regenerating the recording track of said first magnetic head successively; a first phase comparator circuit for detecting a phase difference between the output of said second magnetic head and said standard signal; a control means for controlling said capstan mechanism by means of the output of said second magnetic head; a second phase comparator circuit for detecting a phase difference between said standard signal regenerated by said second magnetic head and a signal corresponding to the rotational phase of said rotary head means; a first supply means for supplying the output of said second phase comparator circuit to said control means as a control signal; and a second supply means for supplying said regenerated control signal to said rotary head means as a standard signal.

* * * * *